April 12, 1955   C. PETERSON   2,705,935
PROPELLER DRIVEN MOTOR VEHICLES
Filed June 19, 1952   2 Sheets-Sheet 1
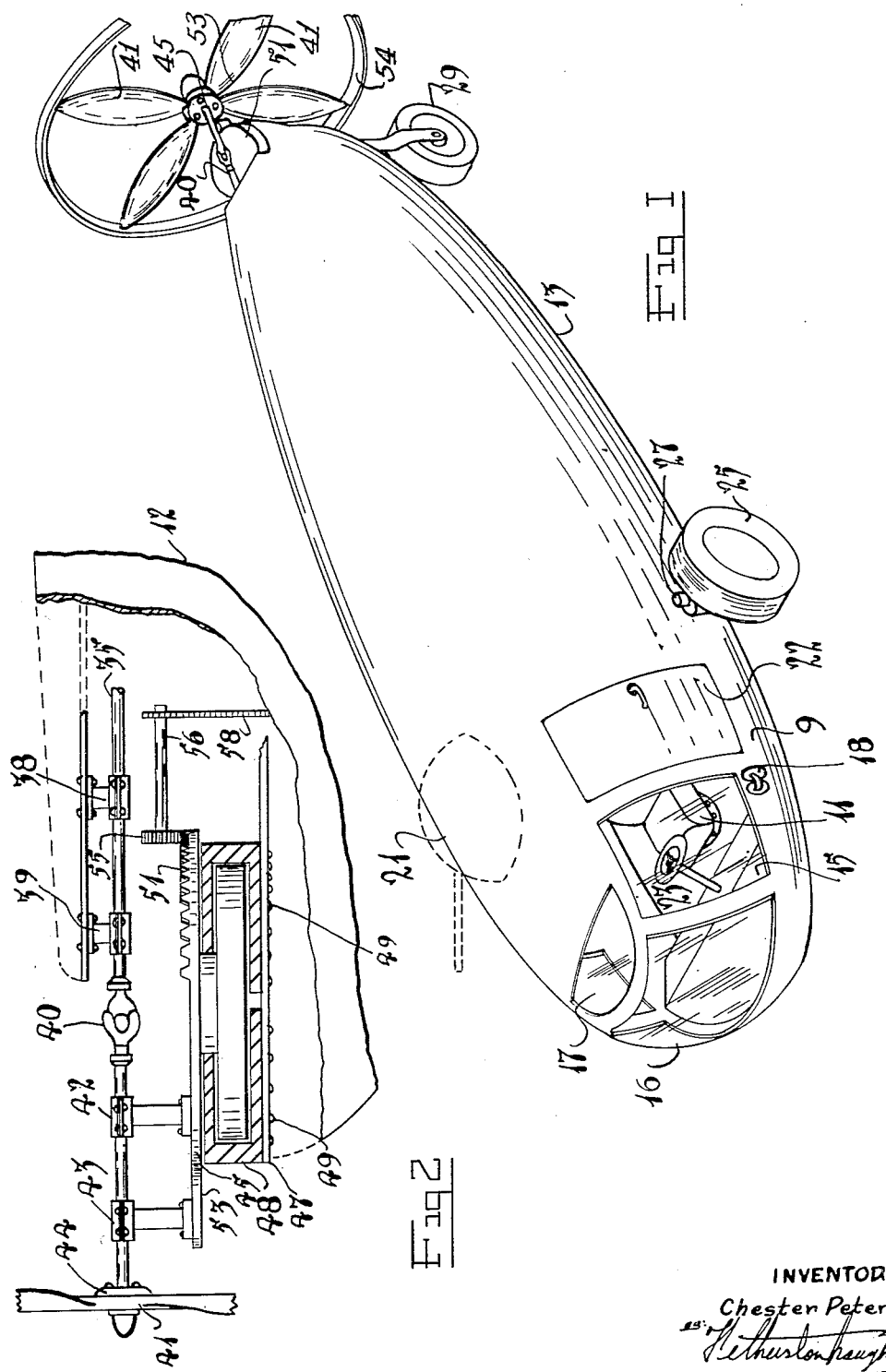
INVENTOR
Chester Peterson April 12, 1955  C. PETERSON  2,705,935
PROPELLER DRIVEN MOTOR VEHICLES
Filed June 19, 1952  2 Sheets-Sheet 2
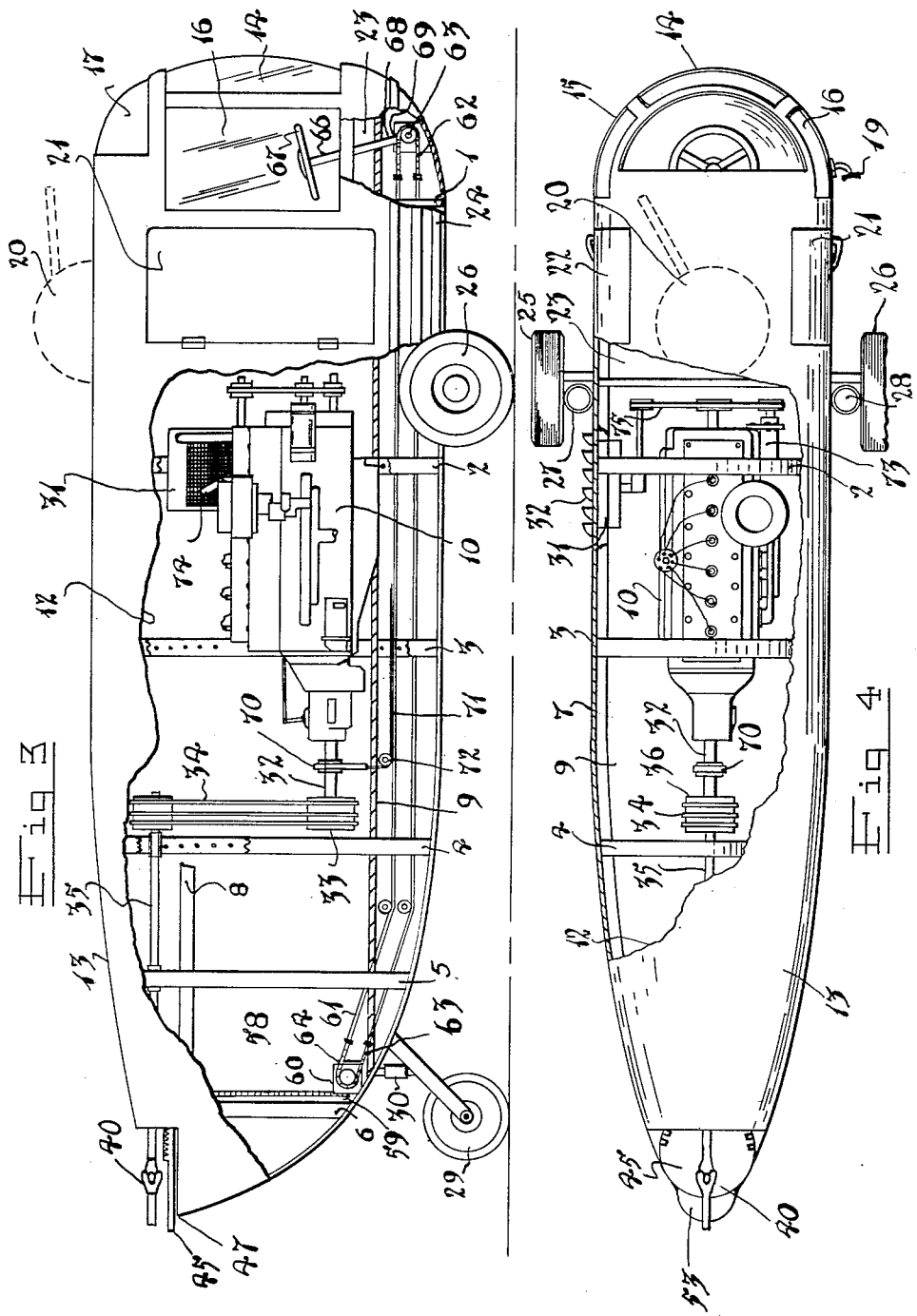
INVENTOR
Chester Peterson

United States Patent Office 2,705,935
Patented Apr. 12, 1955

---

2,705,935

PROPELLER DRIVEN MOTOR VEHICLES

Chester Peterson, Calgary, Alberta, Canada

Application June 19, 1952, Serial No. 294,403

1 Claim. (Cl. 115—1)

My invention relates to propeller driven motor vehicles, particularly to pusher type propeller driven motor vehicles, an object of which is to provide a device of the character hereinafter described, which depends upon an air reaction rather than conventional rolling friction for tractive effort.

A further object of my invention is to provide a device of the character herewithin described which is particularly adaptable for travel over ice or packed snow where traction provided by frictional resistance to wheel rotation is, at best, uncertain but generally unsatisfactory.

A still further object of my invention is to provide a device of the character herewithin described which is inherently adapted for amphibious operation without preliminary modification or adjustment.

Another object of my invention is to provide a device of the character herewithin described which can be readily modified for military use.

And another object of my invention is to provide a device of the character herewithin described which is simple and relatively economical to manufacture and operate, and which is exceptionally well suited to the purposes for which it is intended.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a general perspective view of my device.

Figure 2 is a rear end detail, vertically sectioned and with a portion of the fuselage skin cut away.

Figure 3 is a side elevation with portions of fuselage skin cut away to reveal the interior.

Figure 4 is a top plan view in which a portion of the skin is likewise cut away to reveal the interior.

In the drawings like characters of reference indicate corresponding parts in the different figures.

The need for a versatile means of transportation over roadways that are subject to a wide variation of surface conditions and which can provide transportation without necessitating unloading and reloading for stretches of water travel, has long been felt and probably needs no demonstration. When to ordinary conditions, the change from summer to winter is added, it usually means a change to some comparatively tedious form of skid or sleigh tractor train or a more primitive dog-drawn sledge. These varying conditions are amply provided for in my amphibious propeller-driven motor vehicle, which provides transportation in water and over portages, or over ice and snow covered winter roads with speed and without transfer of load.

Proceeding now to the detailed description of my invention, reference is made to the drawings in which it will be seen that I have provided a plurality of main frames 1, 2, 3, 4, 5 and 6, arranged upon the longitudinal axis of my amphibious vehicle in substantially vertical orientation. These frames are disposed upon and spaced longitudinally by stringers, such as 7 and 8, which contribute longitudinal strength and support the decking 9 upon which the power plant 10 and seats such as 11 are mounted. The entire structure is then enclosed in "stressed-skin" plating 12, except for apertures provided for visibility in the forward or bow end of the resultant fuselage 13. These apertures comprise a group of transparent plastic panels of convex curvilinear conformation windscreen 14, port and starboard side view panels 15 and 16 respectively and a skyview panel 17 affording forward and upward visibility. Port and starboard rear-view mirrors 18 and 19 are mounted on the outer surface of the fuselage convenient to the occupant of the driver's seat 11 and complete the arrangements for visibility (with the possible exception that if required for military purposes, a conventional transparent gun turret dome of aircraft type 20 could be installed without difficulty). Two hinged ports 21 and 22, one on either side of the aforesaid fuselage and immediately off of the anterior section thereof hereinafter designated the cockpit 23, provide ingress thereto and exit therefrom. The lower external surface of the said fuselage is reinforced by longitudinal cleats 24 along the underside thereof for the protection of the skin 12 as well as affording means to prevent sideway movement of the vehicle when travelling over snow covered terrain.

The entire fuselage 13 is borne upon port and starboard, retractable, aircraft type landing wheels 25 and 26 respectively. These wheels are mounted upon aircraft type hydraulic shock absorbers 27 and 28 and are equipped with a hydraulic braking system similar to that commonly used in aircraft (not illustrated).

A castoring, retractable and steerable tail-wheel 29, with hydraulic shock absorber 30 and steerable through linkage, which is not illustrated, completes the land undercarriage for the vehicle.

The aforementioned power plant 10, which is mounted upon the decking 9 referred to hereinbefore, is equipped with conventional cooling radiator 31 and radiator ports 32. Power is transmitted from the driveshaft 32 of said power plant, through pulley 33 and V belt or link belt, drive 34 to a countershaft 35 and its drive pulley 36. This countershaft is journalled in bearings 37, 38 and 39 mounted upon structural members of the vehicle by conventional means. The countershaft transmits power, through a universal joint 40 to an airscrew 41 of special design. Additional bearings 42 and 43 support the countershaft between the universal joint and the airscrew hub 44.

The bearings 42 and 43 are mounted upon a revolving turntable 45 which comprises part of the propeller mount, collectively designated 46.

The propeller mount 46 is located at the stern of the vehicle on an elevated decking 47 substantially horizontal and comprised of deck plates. This decking supports hollow bearing cylinder 48, which is secured thereto by means of rivets 49 or other similar conventional means. This cylinder is composed of two halves to permit of assembly and dissembly, divided transversely and vertically. A turntable 49' is journalled within the aforesaid cylinder 48, the hub 50 of which extends upwardly through the said cylinder opening provided for same. The aforementioned hub 50 is secured to a ring gear plate 51 half of the upper surface of which is provided with radially disposed gear teeth 52. The remaining untoothed portion of the ring gear plate 51 is extended rearwards to form an overhanging projection 53 or platform of semi-circular conformation upon which rearmost bearing 43 is supported. The aforementioned universal joint 40 in countershaft 35, is located precisely over the vertical shaft center line of the afore-described turntable 45. It should be noted that in Figure 2 I have shown the turntable portion 49' as being spaced from the bearing cylinder 48 for clarity but it should be appreciated that these two parts are assembled with a close running fit.

The aforesaid four-bladed airscrew 41 is mounted on the posterior end of countershaft 35 by conventional means. The blade tips of the said airscrew are interlinked by a circular protective ring, 54, fabricated of steel tubing, suitably finished and plated and welded or otherwise conventionally and rigidly secured to the tips of each of the four-blades of said airscrew for strengthening and protective purposes.

Meshing with the afore-described turntable radial gearteeth 51, a pinion gear 55 is provided. Said pinion gear is affixed upon counter shaft 56, which is suitably and conventionally supported in pillow blocks which are not depicted in the drawings hereto appended. A spur gear 57 is mounted upon the said countershaft end opposite to that upon which the said pinion is mounted. A transmission chain 58 links said spur gear with a corresponding spur gear 59 which is actuated by and forms a part of reduction gear train 60 mounted upon the lower decking 9 at the sternmost end thereof.

A conventional aircraft type control cable 61 with drive chain sections 62 and 63 meshes with spur pinion gear 64 which is external to reduction gear train 60 at its posterior end, and with spur pinion gear 65 at the other or anterior end. Said anterior end, and said associated pinion gear 65 are located beneath the vehicle cockpit 23 whereat the said pinion is fixed upon and forms a part of the vehicle control column 66. This control column resembles a conventional aircraft control column, except that no elevation control is embodied which, as is well known, involves a hinged fore and aft action on the part of the said control columns. However, port or starboard direction change is initiated by manipulation of the handwheel portion 67 of the said control column. Such manipulation is transmitted through the column proper 68 to the gear box 69 and thence to aforementioned pinion gear 65 by conventional chain means (not illustrated).

A crankshaft 20 is fitted to the engine crankshaft, with control cable 71 acting over direction changing pulley 72, and controller from the aforesaid cockpit 23 as part of a conventional syndero-mesh transmission, including reversing gearing, which is not specifically shown in the accompanying drawings, but which is embodied as part of the power plant 10. Other conventional engine accessories such as generator 73 and fan 74 and fan belt 75 are likewise embodied as part of the vehicle power plant, together with essentials such as fuel tank and storage batteries, not designated.

From the foregoing it will be apparent that I have provided a versatile vehicle capable of transporting cargo or passengers over a variety of terrain. Moreover, for adidtional versatility the wheels 25, 26 and 29 may be ski-equipped for more rapid travel over suitable ice-covered lake or stream when conditions permit. Also the cockpit may be elaborated with galley, radio receiver and transmitter, chemical toilet and similar items of equipment readily adaptable from aircraft utilization, which may further enhance the value of my vehicle and extend its usefulness.

The vehicle operates in the same way, notwithstanding the nature of the medium of travel, that is, whether overland, in water or over snow or ice. Propulsion is accomplished by air displacement through the operation of the airscrew, which effectively renders the vehicle independent of tractive limitations such as with conventional traction means involving friction between wheel or track-type treads and road surface.

In operation then the power plant, controlled by the operator within the cockpit, is started in conventional self-starting manner. Power, thus generated, is transmitted to the air-screw 41 by means of the crankshaft 32, transmission belts 34, pulleys 33 and 36, to countershaft 35 as soon as the operator causes the clutch to engage after selecting the direction of travel (that is whether forward or reverse) and the speed. If in a shelter, or parked, reverse rotation of the airscrew will cause the vehicle to move in reverse. Change in direction can then be simply effected by manipulation of the hydraulic wheel brakes, to which reference was made hereinbefore, in combination with the crankshaft brake and clutch, also previously referred to, thus bringing the vehicle to a stop while the operator selects forward travel in low gear in conventional manner. The vehicle is then set in motion by engaging clutch and releasing wheel and crankshaft brakes. Change in direction is then available to the operator in a natural and conventional handwheel manipulation in either direction as desired by him. This, as indicated hereinbefore, through control column, control cable and turntable, causes simultaneous angular displacement of the airscrew and the castoring tailwheel. The former, hinging about the turntable hub and the universal joint 40 in countershaft 35, provide left or right midder action and enable the pilot to maneuver with complete direction control. Control in the remaining aspect of travel, namely, velocity, is achieved in equally conventional manner, by throttle control of engine revolutions, and thus in turn, to airscrew revolutions. Very good visibility in all directions is afforded the operation from the cockpit by the comparatively large area of transparent panelling provided.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In a vehicle adapted to be propelled on land or buoyantly in water, including a framework and a source of power; a steering assembly for said vehicle, said steering assembly including propulsion means connected to said source of power, said propulsion means including a shaft extending from the rear of said vehicle, an air screw upon said shaft, and means cooperating with said steering assembly whereby the longitudinal axis of said shaft may be varied within limits, thereby supplying the steering function of said means to said vehicle, said means for varying the longitudinal axis of said shaft including a turntable mounting for said shaft, said shaft being connected to said source of power through a universal joint, said universal joint being situated substantially centrally over said turntable, teeth formed on part of the perimeter of said turntable, and a gear cooperating with said teeth, said gear being operatively connected to said steering assembly, said turntable mounting including a hollow bearing cylinder mounted adjacent the rear end of said vehicle, a turntable mounted for rotation within said cylinder, a centrally located hub extending upwardly from said turntable, a ring gear plate secured to the upper end of said hub, said shaft being mounted for rotation upon said ring gear plate.

References Cited in the file of this patent

UNITED STATES PATENTS

| Number | Name | Date |
|---|---|---|
| 441,049 | Barcroft | Nov. 18, 1890 |
| 872,778 | Ashley | Dec. 3, 1907 |
| 1,007,486 | Proksa | Oct. 31, 1911 |
| 1,302,048 | Huxford | Apr. 29, 1919 |
| 1,414,241 | Wells | Apr. 25, 1922 |
| 1,420,783 | Swencki | June 27, 1922 |
| 1,481,707 | Green | Jan. 22, 1924 |
| 1,643,314 | Novak | Sept. 27, 1927 |
| 1,863,940 | Ranke | June 21, 1932 |
| 2,131,155 | Waller | Sept. 27, 1938 |
| 2,341,911 | Drexler et al. | Feb. 15, 1944 |
| 2,376,626 | Schuller | May 22, 1945 |
| 2,420,764 | Zuck | May 20, 1947 |
| 2,426,742 | Pawlowski | Sept. 2, 1947 |
| 2,611,554 | Sanders | Sept. 23, 1952 |